United States Patent [19]

Sala

[11] Patent Number: 5,642,238
[45] Date of Patent: Jun. 24, 1997

[54] ERGONOMICALLY EFFICIENT SIDE AND REAR VISION SYSTEM FOR MOTOR VEHICLES

[75] Inventor: Martin A. Sala, Mount Morris, N.Y.

[73] Assignee: MBS Foundry Inc., Mount Morris, N.Y.

[21] Appl. No.: 380,113

[22] Filed: Jan. 30, 1995

[51] Int. Cl.⁶ ............................................. G02B 7/182
[52] U.S. Cl. ........................ 359/871; 348/148; 348/370
[58] Field of Search ........................... 348/113, 118, 348/148, 370; 359/843, 871

[56] References Cited

U.S. PATENT DOCUMENTS

| | | | |
|---|---|---|---|
| 3,689,695 | 9/1972 | Rosenfield et al. | 178/7.81 |
| 4,167,592 | 9/1979 | Gabel et al. | 427/137 |
| 4,214,266 | 7/1980 | Myers | 358/108 |
| 4,227,804 | 10/1980 | Robison | 358/108 |
| 4,665,430 | 5/1987 | Hiroyasu | 358/108 |
| 4,797,736 | 1/1989 | Kloots et al. | 358/93 |
| 4,843,463 | 6/1989 | Michetti | 358/108 |
| 4,910,591 | 3/1990 | Petrossian et al. | 358/103 |
| 4,968,124 | 11/1990 | Deckert et al. | 350/574 |
| 5,027,200 | 6/1991 | Petrossian et al. | 358/103 |
| 5,121,200 | 6/1992 | Choi | 358/103 |
| 5,243,417 | 9/1993 | Pollard | 358/103 |
| 5,289,321 | 2/1994 | Secor | 359/896 |
| 5,299,012 | 3/1994 | Tsuruta et al. | 348/370 |

FOREIGN PATENT DOCUMENTS 405323170A  12/1993  Japan .

Primary Examiner—Timothy P. Callahan
Assistant Examiner—Jung Ho Kim
Attorney, Agent, or Firm—Crossetta & Associates

[57] ABSTRACT

The invention comprises an ergonomically efficient rear and/or side view monitoring system wherein a video camera is mounted at the rear and/or sides of a vehicle and transmits images to a viewing screen which is integrally mounted in a side view mirror arrangement and displays a mirrored image of a rear view as an insertion to the reflective mirrored view of the side view mirror.

28 Claims, 4 Drawing Sheets

ERGONOMICALLY EFFICIENT SIDE AND REAR VISION SYSTEM FOR MOTOR VEHICLES

This invention relates to an improved rear and/or side view monitoring system for use with motor vehicles, wherein a camera is mounted for observing views rearward of a motor vehicle driver and a viewing screen is mounted integral with a side view mirror for ergonomic observation and decision by the driver.

BACKGROUND OF THE INVENTION

With the expansion in ever larger motor vehicles for hauling an ever growing variety of cargos, has come an increasing concern that the operators of such vehicles be provided with an unobstructed view of potential dangers from which they might guide their vehicle without incident. In large elongated vehicles, such as buses, tractor trailers, motor homes and the like, the observation of potential danger to the rear and sides of the vehicle, during forward driving and rearward maneuvering, has always been problematic because turning of the drivers head from the forward driving position is awkward and can create a dangerous distraction. Even when a forward view is not essential, such as when backing a tractor trailer combination, the pivoting action of the combination can so change the lines of sight within the typical rear mirror arrangement as to cancel desirable mirrored views.

Mirrored means have been devised which provide a barely adequate view of potential danger along the sides of elongated vehicles but direct view to the immediate rear of the vehicle is generally obstructed. In a typical elongated cargo or the like vehicle, the mass of vehicle arranged behind the driver so obscures rearward view that mirrored means are generally mounted to the sides, exterior to the driver's compartment, and forward the drivers position to enable reflected view of the vehicle sides and rear. Such mirrored means have become pervasive in the driving experience and vehicle operators rely so heavily upon them to perform their driving duties that their use has become natural and impulsive to the drivers experience.

In recent years, video means have been suggested for use in rearward vision enhancement for larger vehicles, but such has not met with great success. In a typical arrangement, a video camera is mounted to the rear of the vehicle and a cathode ray tube is mounted, in operating enablement with the camera, somewhere within the vehicle driver's compartment. Such arrangements are generally rejected by drivers, being seen as distractions from their normal viewing experience in that they require a driver to position his head and focus his attention in directions that are ergonomically foreign to the natural impulse that his driving experience has developed and can confuse his reaction to the immediate forward driving concern that must be addressed.

Thus, the learning experience of a typical driver includes operation of a multiplicity of vehicles which have similarly mounted rearward viewing mirrors which tend to train the driver to impulsively look to left and right side mounted mirrors to determine potential left and right side dangers and naturally integrate the mirrored image that is seen, into the mental decision that must be made in order to take action to avoid the dangers that might be present. The placement of a cathode ray screen in a position foreign to such impulse adds complexity and indecision to the mental processing of the situation and becomes burdensome and even dangerous to the driving experience.

Further, in such prior art arrangements, the cathode ray screen displays an image which comprises the direct view of the camera. Such direct view is in contrast to the mirrored view of the drivers experience for rearward viewing and adds further complexity to the mental processing of the situation which further burdens the immediate decision and increases the danger of error in the driving experience.

An object of the present invention is to provide a means for vehicular rearward viewing which is ergonomically consistent with driver impulsive movement.

Another object of the present invention is to provide a means for vehicular rearward viewing which is integrated with existing mirrored arrangements.

Another further object of the present invention is to provide a means for viewing areas which are not generally within the sight line of the driver.

A further object of the invention is to provide a device for vehicular viewing which is compact and portable.

A still further object of the invention is to provide a device which is capable of bringing enhanced view to the driver.

These and other objects of the invention will be apparent from the following description of the invention.

SUMMARY OF THE INVENTION

The present invention is an ergonomically efficient arrangement for rearward viewing in a vehicular environment comprising a video camera and a video display device in enabling rear viewing arrangement. Provision is made for mounting the video camera separately or in a side and/or rear lighting unit arrangement and integrating the video display, preferably a flat panel display such as a thin film transistor or liquid crystal display (LCD) and the like, in a mirrored surface mountable in a exterior side view arrangement. The enabling circuitry among the video camera and the display is arranged to provide a mirror image on the video display of the rearward and/or side view, which is consistent with the mirror image of the common side view mirror, and means are provided for appearance or disappearance of the video display image at the command of the driver.

Video cameras operable in the invention are well known and commercially available in a wide variety of sizes and shapes. A particularly preferred video camera for use in the invention is the common miniature variety, which is small enough to enable placement of the camera within common vehicular side and/or rear marker or other lighting or the like assemblies. Integrating such cameras in a side and/or rear lighting assembly provides anonymity for security from theft and can provide a convenient background light source for rearward viewing in low light situations.

In a preferred embodiment of the invention, provision is made for mounting a miniature camera in a lighting assembly which has an appearance similar to a commonly available truck and/or trailer marker, tail, stop, back-up or the like lighting assembly. The lens of the camera is preferably positioned to view centrally from a rear mounted light assembly lens and the light source of the assembly is generally preferred to be reflected from the rear of the camera to provide a surrounding light source to enable camera viewing of otherwise darkened images.

It should be understood that this invention contemplates mounting of the camera in any convenient position for viewing in any desirable direction and is not limited to mounting in a light assembly or the like. Thus, it is contemplated to mount the camera along the sides of the vehicle as well as to the rear of the vehicle, and, in certain applications, at the front of the vehicle.

For example, on large vehicles where contemporary mirrored side view arrangements have areas which are blind from the drivers view along the sides of the vehicle, it is contemplated to mount appropriate aligned cameras along the side of the vehicle to provide a mirrored image of the blind area for enhanced drivers view. In a further example, the area immediately forward the front of a school bus or the like, may be obstructed from the drivers view such that small children or the like walking in front of the bus cannot be seen by the driver. In such instance a camera may be mounted at about the front of the vehicle which would provide visibility of such walk area.

In a preferred embodiment of the invention, a generally flat video display screen is mounted integral to a reflective element of a side mirror arrangement in such manner that the image on the video display is within a general area of sight that a driver might focus when observing a normal reflected image on the reflective element of a side mirror arrangement.

In a particularly preferred embodiment the reflective element is elongate and comprises an elongated transparent component and an image reflecting surface. The reflective element is adjustably mounted to the side of the drivers compartment. The generally flat video display screen is positioned behind the transparent component so that the driver views the screen through the transparent component and the screen is protected from weather thereby. In a particularly preferred embodiment, the viewing screen comprises a surface which is reflective when the display is deactivated so that when desired, the viewing screen can be deactivated and the reflected image in the side mirror appears as a continuous mirrored side view or the like.

The reflective element may comprise polarizing, screen, shade or other means to reduce the incidence of natural or unnatural glare from lights and/or daylight which might reduce the visual effectiveness of the display screen. It should be understood that it is contemplated as within the invention to incorporate means for enhancing the brightness and/or contrast of the display screen for differing light conditions.

The display screen is electronically enabled to provide a mirrored image of the rearward view gathered by the camera. Such mirrored image should be consistent with the mirrored image reflected in the remainder of the side mirror to reduce the incidence of mentally conflicting images being presented to the driver.

The electronic enablement of the arrangement and devices of the invention for electronic enablement are commonly known in the prior art. For example, camera lens may be of fixed focus, may be manually adjustable or may be automatically self-adjusting for distance. It is contemplated that the camera or interrelated components may comprise distance measuring means which may provide a digital readout of distance on the viewing screen and/or provide a multiplicity of variations of alarm and/or warning designations, sound and/or visual, to the driver under diverse circumstances. The viewing screen may be automatically activated when the vehicle is in a rearward direction and may be deactivated under other conditions.

One or more display screens may be present on a mirror, and/or a screen may be arranged to display images from one or more cameras. The view on a screen may be controllable to display the image of different camera's, automatically and/or at the control of the driver. Thus, a single screen may be partitioned automatically and/or at the control of the driver to provide views of cameras at one or more sides, the rear and/or front of the vehicle and/or multiple screens can be arranged on the mirror for such effect. In a school bus arrangement, wherein a driver has a responsibility to view oncoming traffic, as well as rear and side moving traffic, all while discharging students who may be crossing in front of the bus, a single partitioned viewing screen and/or separate viewing screens, arranged in the drivers side view mirror would provide a consistent view of all directions while providing a view of the front of the vehicle for locating a student who might otherwise be obstructed from view by the front end of the bus.

It is contemplated that within such multiple view arrangements, the image displayed on the screen at the side mirror position would be consistent with the drivers expected visual experience. Thus side and rear view displays might be electronically routed as mirrored image displays as distinct from the direct image of the camera. Front view images might be a direct camera image as would be consistent with the normal viewing experience of a driver.

There is a multiplicity of permutations of the arrangement of components contemplated by this invention which, together with the advantages of the invention, will be more fully understood from the following detailed description of preferred embodiments.

DETAILED DESCRIPTION OF THE DRAWINGS

Figure 1:
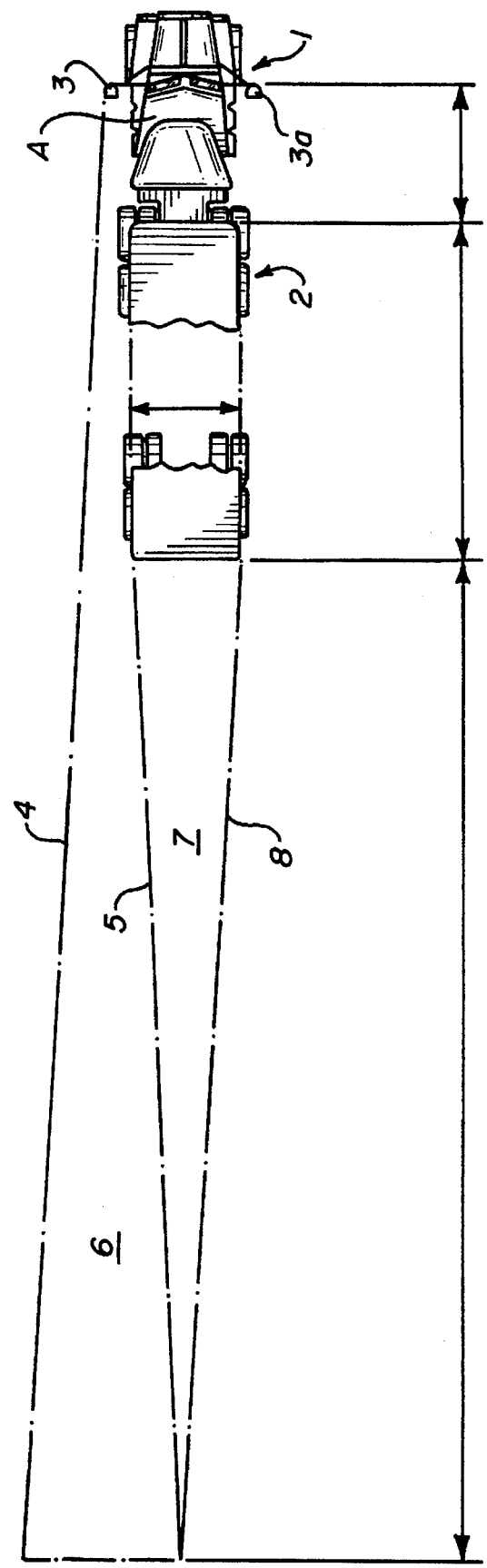
FIG. 1 is a schematic illustration of reflective mirrored sight line of a typical tractor-trailer vehicle.

Referring now to FIG. 1, wherein truck tractor 1 is shown in typical pulling arrangement with an elongate trailer 2, having rear view side mirrors 3 and 3a. The driver of tractor 1 is generally positioned at about A in a left side driver control vehicle, with lines 4 and 5 illustrating generally mirrored rearward sight lines encompassing the area 6 by a driver from about position A through side view mirror 3. Lines 5 and 8 extending rearward from the ends of trailer 2 to a remote point of convergence, generally define what is generally referred to as the blind spot 7 behind a trailer which spot is obscured from the view of a driver in a mirrored view arrangement.

Figure 2:
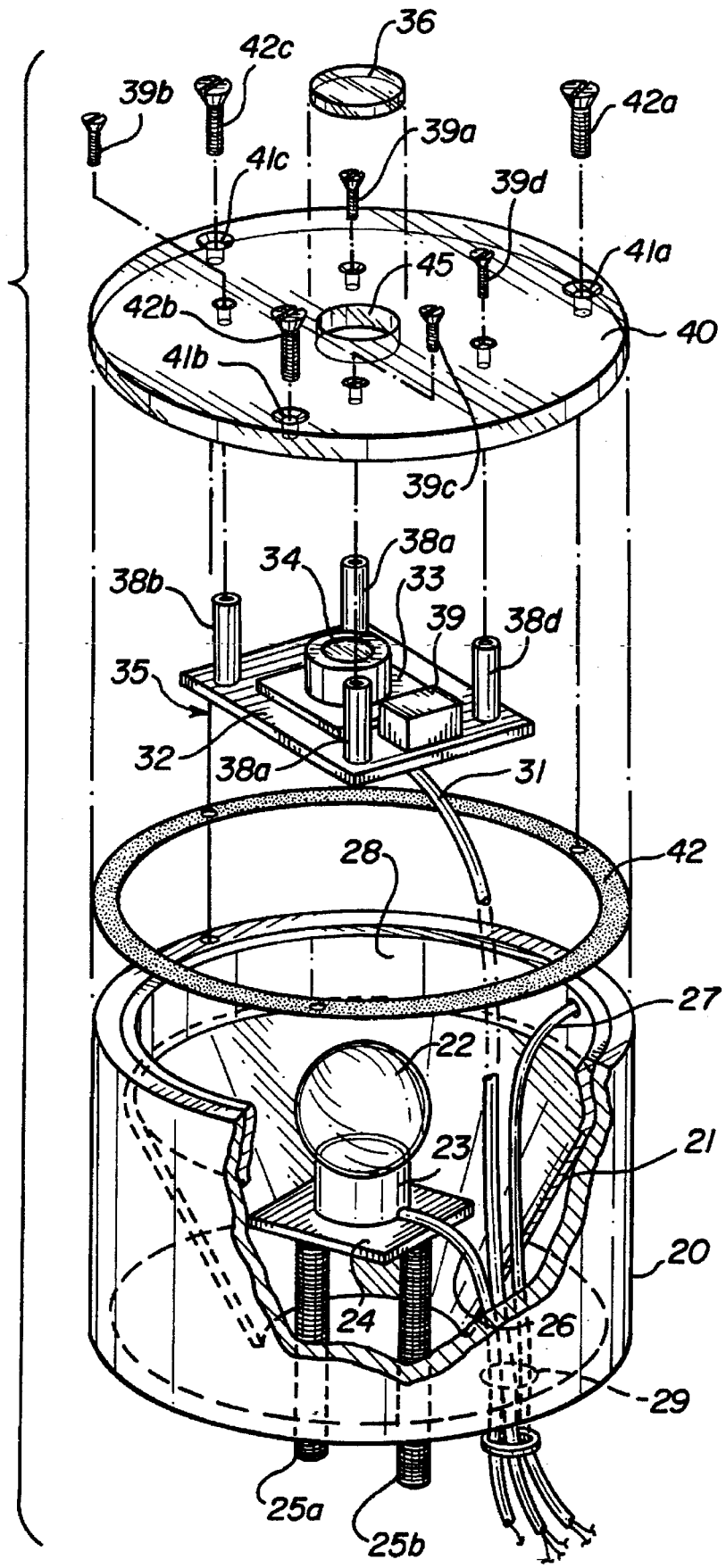
FIG. 2 is an exploded sectional perspective view of a video camera-light assembly of the invention.

FIG. 2, illustrates an embodiment of a rear viewing video apparatus of the invention comprising a video camera mounted in a light assembly. Therein, light assembly housing 20, comprises light reflector 21 and light bulb 22 arranged in light socket 23, which is mounted to plate 24 comprising threaded mounting means 25a and 25b which extend through corresponding holes in housing 20 and are used to mount the assembly to a vehicle. Lighting wire 26 is arranged in electrical enablement with a filament of light bulb 22. Heating wire 27 is in electrical enablement with resistant heater 28, and together with video input wiring 31 and lighting wire 26 extend through hole 29 for appropriate electrical connection to an electric power source.

Lens 40 comprises holes 41a–c sized to receive mounting screws 42a–c for mounting of lens 40 and gasket 42 to corresponding threaded holes in housing 20. Video camera 35 is depicted as comprising electronics circuit board 33, mounted to plate 32, optical lens 34 and optical lens 36. Mounting plate 32 further comprises environment sensing and/or control means 37 and mounting spacers 38a–d which enable mounting of the video camera to lens 40 through screws 39a–d. Optical lens 36 is mounted to lens 40 through hole 45.

In the embodiment of FIG. 2, optical lens 36 and 34 are arranged in a focus environment which is fixed in accord with the distance between the lens. It should be understood that it is contemplated that the focus of the video camera may be adjustable through telescoping of the housing of lens 34. Video wiring 31 generally comprises a multiple of electronic signal conductors, including video signal conductors and environmental sensing and/or control conductors.

In the operation of the camera, video signals, operating signals, environmental signals, electrical power and the like are transmitted to and from the assembly for control of the operation of the camera and the environment in which its mounted.

Figure 3:
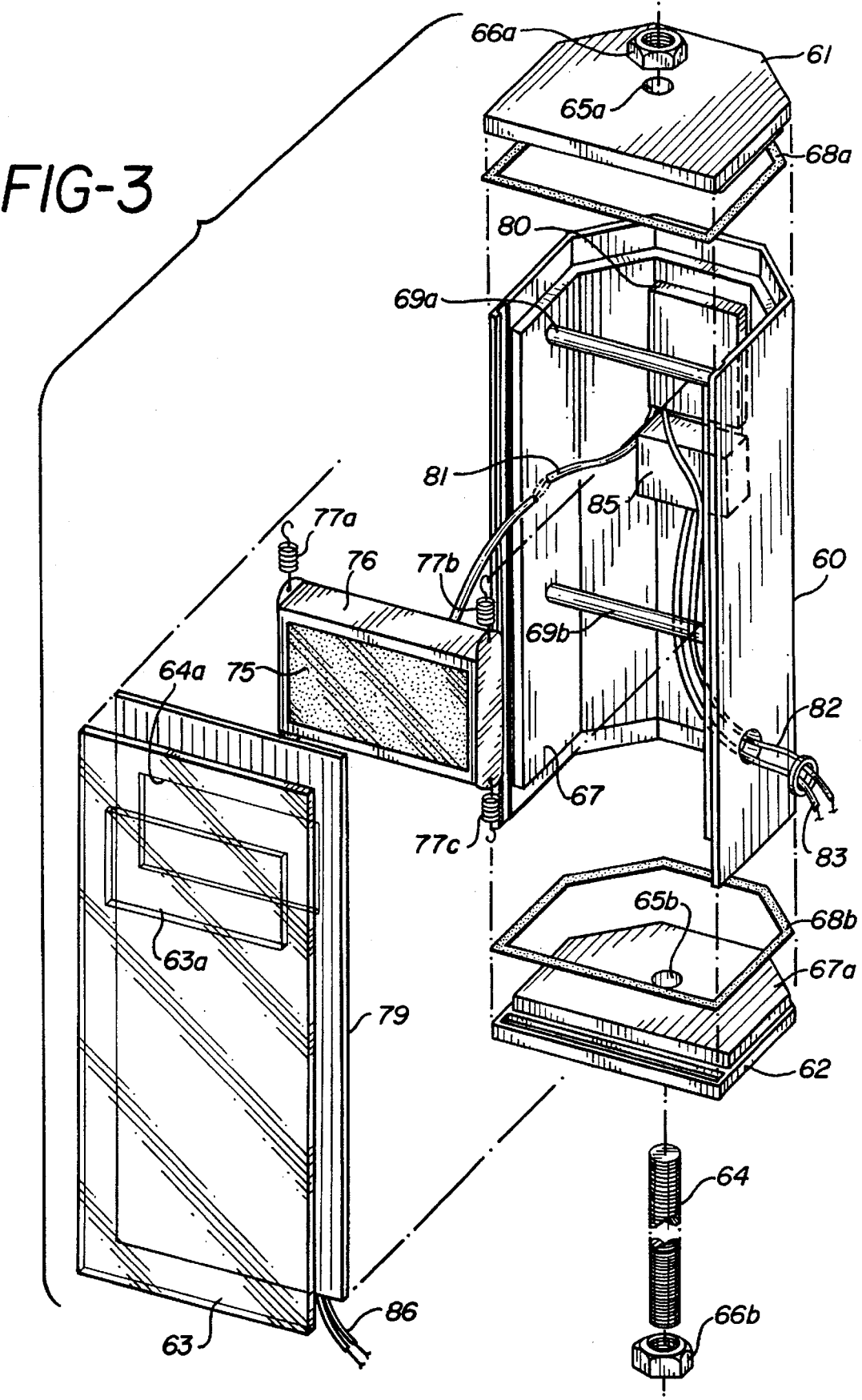
FIG. 3 is an exploded sectional perspective view of a video display-side mirror assembly of the invention.

FIG. 3 comprises an embodiment of a viewing screen mounted in a side mirror assembly. Therein, the side mirror assembly is illustrated as comprising housing 60, housing upper end cap 61, housing lower end cap 62 and mirrored glass 63. Threaded attachment rod 64 extends through holes 65a and 65b of end caps 61 and 62 respectively and the assembly is held together by nuts 66a and 66b. Housing 60 preferably comprises thermal insulation 67 with the end caps comprising insulation 67a. Gaskets 68a and 68b are positioned between the end caps and housing 60. Support rods 69a and 69b are attached at their ends to housing 60. Display screen 75 is mounted in frame 76 which is mounted through springs 77a, 77b, 77c and 77d (not shown), to support rods 69a and 69b. Video enablement electronics are illustrated as comprised in block 80 and environmental sensing and/or control assembly 85. Video enablement electronics comprised in block 80 are connected through wiring 81 to display screen 75 and to a remote further control management unit through wiring 82. Sensing and/or control electronics assembly 85 is illustrated as connected through wiring 83 to a remote further control management unit.

Mirrored glass 63 is illustrated as comprising an area at 63a through which an image on display screen 75 can be viewed. Resistant heater 79 is illustrated as being positioned behind mirrored glass 63 and comprising an opening 69a through which an image on display screen 75 may be viewed. Wiring 86 is provided to enable the resistant heater and generally exits the mirror assembly with wires 82 and 83.

The side mirror is mounted, through threaded attachment rod 64, to an appropriate support means, which is mounted to the side of a vehicle generally forward of an operators driving position.

Figure 4:
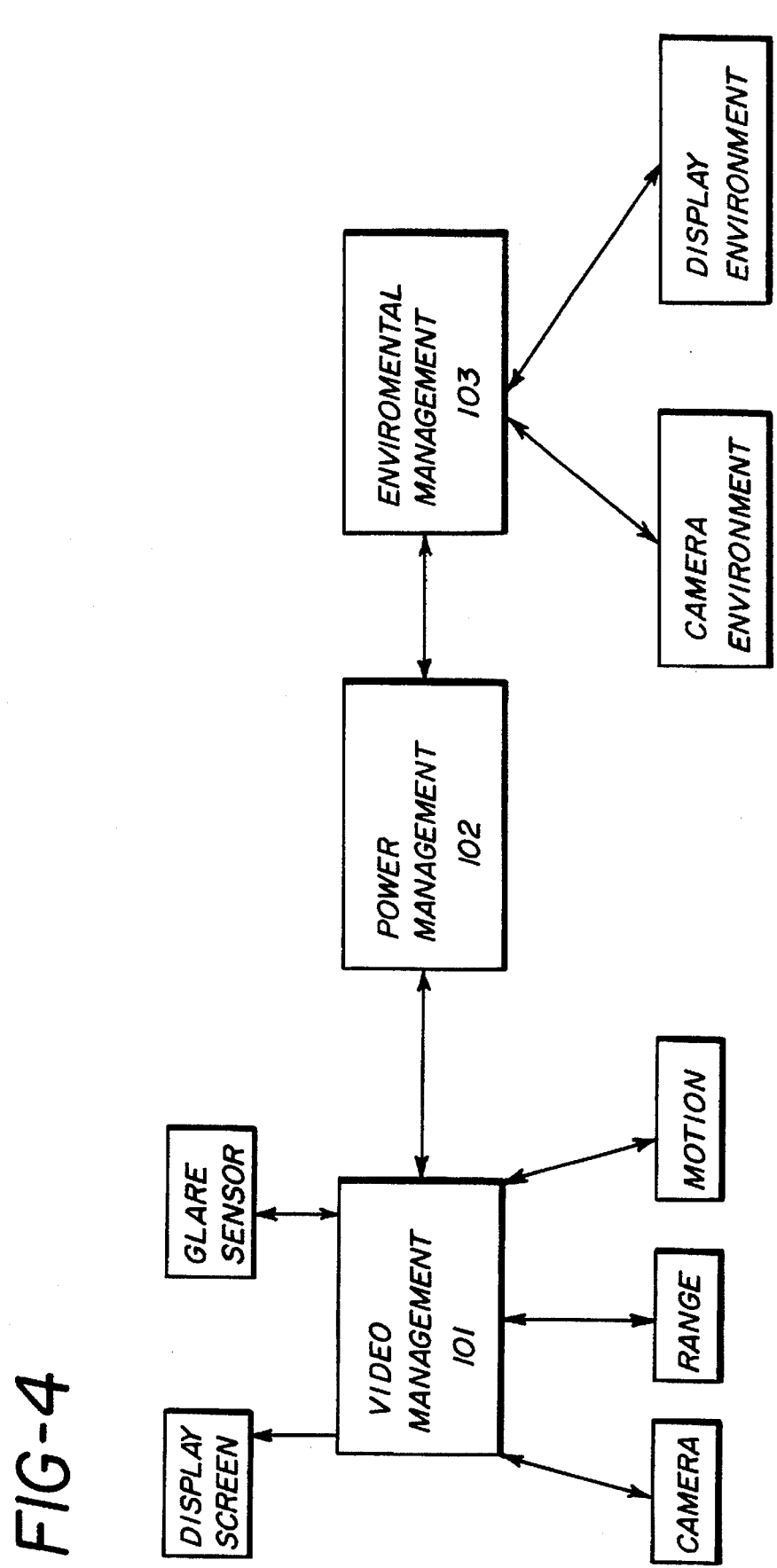
FIG. 4 is a block illustration of electronics management comprising an embodiment of a rear vision system of the invention.

FIG. 4 comprises a diagrammatic block illustration of generic functioning elements of an electronics management arrangement of a side mirror assembly and rear viewing video camera arrangement of the invention. Block 101 represents video management electronics, block 102 represents power management electronics and block 103 environmental management electronics. Generally, functioning elements comprising each are positioned within a central control module(s), remote from the side mirror and/or video camera assemblies, at the driver's control in the driver's compartment of the vehicle, and each are interconnected in management of the rear vision system.

In the embodiment illustrated, the power management element provides basic enabling electrical interaction, generally with the power source of the vehicle, and activation, inactivation and/or operational maintenance of the video camera and side mirror assemblies through operator control and/or through automatic sequencing of vehicle operation. Thus, systems which activate the video camera assembly, the video display screen and/or the environmental control means may be turned on/off at the control of the operator through the power management unit and/or may be automatically linked to various conditions, particularly environmental, and/or events occurring within the operation of the vehicle such as forward and/or rearward drive engagement by the driver, turn signal, lighting and/or the like lighting activation, receipt of ranging data and the like.

Generally, power management element 102 is in direct communication with environmental management element 103 which in turn is in communication with sensing and/or control assemblies 37 and 85 of the side mirror and/or video camera assemblies respectively of the invention. Thus, sensing and control assemblies of the video camera and/or side mirror assemblies may comprise temperature or the like sensing means which provide a signal to environmental management element 103 which in turn interacts with power management element 102 to select and enable an appropriate response in the video camera and/or side mirror assemblies such as activating and/or deactivating a resistant heater, heat pump or the like environmental control unit.

Video management element 101 is also generally in communication with power management element 102 and is generally dependent thereupon for enablement through the generic vehicular power source. Video management element 101 generally comprises means for managing the video signal received from the camera and providing an appropriate image on the display screen. In a preferred embodiment it generally adjusts the view of the rear vision camera and coordinates and/or adjusts the image appearing on the display screen therewith. It should be understood that generally manual adjustment means are also provided at the central control module to enable driver control of various characteristics of the display screen and/or camera adjustment.

In addition, ranging, motion or the like sensing means in the video camera assembly may signal video management element 101 which in turn may initiate a signal on the video display screen and/or warning light, sound or the like response to appropriately advise a driver. Glare sensing means or the like may be arranged to interact with the video management element for automatic variation of the intensity of an image projected on the viewing screen for the convenience of the driver during varying driving conditions.

The embodiment of the invention as presented in the figures can be hard wired and/or radio wave interconnected. Thus the invention anticipates that a video display assembly and/or camera assembly arrangement may comprise receiver and/or transmitter means for relaying information to a central control module(s) and/or to each other for convenient portability from vehicle to vehicle.

The devices of the invention may be linked with video recording or the like means for providing a permanent record of a driving event. Automatic safety devices may be linked with events such as automatic brake engagement on rearward ranging signal and/or image enlargement during reverse movement of the vehicle. Automatic signaling can be triggered by steering activity with image identification or the like.

I claim:

1. An ergonomically efficient arrangement for viewing by a driver from a vehicular driving compartment, comprising a video camera and a video display screen in enabling arrangement; said video camera being mounted for viewing an area obstructed from said driver's casual view; said video display screen being mounted exterior to the driver compartment, contiguous with a reflected view means; and, said video camera cooperating with said video display screen which enables generation of a video image on said screen which is consistent with the reflected image of said reflected view means.

2. The arrangement of claim 1 wherein said reflected view means comprises a mirrored surface mounted exterior to the driving compartment.

3. The arrangement of claim 1 wherein said reflected view means comprises a reflective element containing a transparent surface and an image reflecting surface.

4. The arrangement of claim 3 wherein the view means comprises a side view mirror which is adjustably mounted to the side of the driving compartment.

5. The arrangement of claim 3 wherein a generally flat video display screen is positioned behind the transparent surface and a driver views the screen through the transparent surface.

6. The arrangement of claim 5 wherein the display screen is mounted contiguous with the mirrored surface.

7. The arrangement of claim 6 wherein the display screen and mirrored surface are encased in weather resistant means.

8. The arrangement of claim 7 comprising environment control means.

9. The arrangement of claim 8 wherein said environment control means comprises at least one of temperature sensing, and heating and cooling means.

10. The arrangement of claim 5 wherein said display screen comprises a surface which is reflective when the display is deactivated.

11. The arrangement of claim 10 comprising video display screen deactivating means and upon deactivation of said display screen said surface of said display screen which is reflective, generally appears as contiguous with said reflected view means said display screen.

12. The arrangement of claim 1 comprising a plurality of video display screens.

13. The arrangement of claim 12 wherein said plurality of display screens are interconnected with a plurality of video cameras.

14. The arrangement of claim 1 comprising a video display screen capable of simultaneously displaying images from a plurality of video cameras.

15. The arrangement of claim 1 wherein said video display image is a direct view image from a video camera.

16. The arrangement of claim 1 comprising means for the driver to activate and deactivate said video display screen.

17. The arrangement of claim 1 comprising means for said driver to adjust the image of said video display screen.

18. The arrangement of claim 1 wherein said video camera is mounted within a lighting assembly.

19. The arrangement of claim 18 wherein said lighting assembly comprises environment control means.

20. The arrangement of claim 19 wherein said environment control means comprises at least one of temperature sensing, and heating and cooling means.

21. The arrangement of claim 18 comprising at least one of ranging sensing and motion detecting means.

22. An ergonomically efficient viewing mirror assembly, comprising a reflective element and a video display screen; said reflective element comprising a transparent component and a reflective surface; said video display screen being mounted juxtapositioned with said transparent component such that an image on said screen is visible through said transparent component of said reflective element and in continuity with a reflected image visible from said reflective surface.

23. The viewing mirror assembly of claim 22 wherein said video display screen comprises a flat panel display screen.

24. The viewing mirror of claim 22 wherein said reflective surface is elongated, and said viewing mirror assembly comprises means for adjustably mounting said assembly to a side of a vehicle.

25. The viewing mirror assembly of claim 22 wherein said video display screen comprises flat panel display means.

26. The viewing mirror assembly of claim 22 comprising enabling circuitry to provide a mirrored image on the display screen of a rearward view.

27. The viewing mirror assembly of claim 22 comprising means for enabling viewing of a display image on said display screen at the control of the driver.

28. The viewing mirror assembly of claim 22 comprising at least one of temperature sensing, and heating and cooling means.

* * * * *